United States Patent Office.

WILLIAM H. JUBB, OF NORWALK, CONNECTICUT.

Letters Patent No. 73,980, dated February 4, 1868.

IMPROVED COMPOUND FOR DESTROYING BURRS IN WOOL.

The Schedule referred to in these Letters Patent and making part of the same.

TO ALL WHOM IT MAY CONCERN:

Be it known that I, WILLIAM H. JUBB, of the town of Norwalk, county of Fairfield, and State of Connecticut, have invented a new and useful Compound for Destroying the Burrs in Wool, and for neutralizing the effects of the acids employed in the operation, and the final extracting the acids and impurities after the burrs are destroyed; and I do hereby declare that the following is a full and exact description of the ingredients used to effect the same.

The nature of my invention consists in the compounding, mixing, and using the within-named ingredients for eradicating the burrs from wool.

To enable others skilled in the art to make and use my invention, I will proceed to describe the same.

The following are the ingredients for the compound for destroying the burrs: Sulphuric acid, one hundred parts, by weight; refined saltpetre, two parts, by weight, dissolved in the proper and sufficient quantity of water for the purpose, regulated by the condition and nature of the wool.

After the hard, knotty nature of the burrs is destroyed, which will be by the aforesaid compound, and they are reduced to a state of powder or pasty substance, I then use the following ingredients, compounded together, which will neutralize the injurious effects of the acids employed, and completely cleanse the wool from the same and all other impurities, rendering the wool bleached to an excellent whiteness, without the least injury to the fibre: Sal-ammoniac, four parts, in weight; soda-ash, thirty parts, in weight; whale-oil soap, ten parts, in weight; lime, five parts, in weight, dissolved in the necessary quantity of water to produce the desired effect.

The utility of my compound for cleaning the wool from burrs and other impurities is in its economy; also in its freedom from the excessive and offensive smell when in operation, and the complete extermination of the burrs without the least injury to the fibre of the wool.

What I claim as my invention, and desire to secure by Letters Patent, is—

The use and combination of the ingredients, as herein described, for destroying the burrs in wool and bleaching the wool, substantially as and for the purpose set forth.

W. H. JUBB.

Witnesses:
  WM. VINE,
  JOSEPH F. FOOTE.